US005139907A

United States Patent [19]

Simpson et al.

[11] Patent Number: 5,139,907

[45] Date of Patent: Aug. 18, 1992

[54] PHOTOSENSITIVE IMAGING MEMBER

[75] Inventors: Yonn K. Simpson, Fairport; Edward F. Grabowski, Webster; Donald J. Teney; Satish R. Parikh, both of Rochester; Neil S. Patterson, Pittsford, all of N.Y.

[73] Assignee: Xerox Corporation, Stamford, Conn.

[21] Appl. No.: 552,200

[22] Filed: Jul. 13, 1990

[51] Int. Cl.[5] ............ G01D 15/14

[52] U.S. Cl. ............ 430/58; 430/59; 430/60; 430/63

[58] Field of Search ............ 430/58, 59, 60, 63

[56] References Cited

U.S. PATENT DOCUMENTS

| | | | |
|---|---|---|---|
| 4,361,638 | 11/1982 | Higashi et al. | 430/58 |
| 4,588,667 | 5/1986 | Jones et al. | 430/73 |
| 4,618,552 | 10/1986 | Tanaka et al. | 430/60 |
| 4,775,605 | 10/1988 | Seki et al. | 430/63 |
| 4,780,385 | 10/1988 | Wieloch et al. | 430/58 |
| 5,051,328 | 9/1991 | Andrews et al. | 430/56 |

FOREIGN PATENT DOCUMENTS

| | | |
|---|---|---|
| 0161933 | 11/1985 | European Pat. Off. . |
| 60-170861 | 9/1985 | Japan . |
| 63-131147 | 6/1988 | Japan . |
| 1-315767 | 12/1989 | Japan . |

*Primary Examiner*—Marion E. McCamish
*Assistant Examiner*—Mark Chapman

[57] ABSTRACT

A layered photosensitive imaging member is modified by forming a low-reflection layer on the ground plane. The low-reflection layer serves to reduce an interference fringe contrast and according to a second aspect of the invention, layer adhesion is greatly improved when selecting $TiO_2$ as the low-reflection material. In a preferred embodiment, low-reflection materials having index of refraction greater than 2.05 were found to be most effective in suppressing the interference fringe contrast.

3 Claims, 3 Drawing Sheets

PHOTOSENSITIVE IMAGING MEMBER

BACKGROUND AND PRIOR ART STATEMENT

The present invention relates in general to electrophotography and, more specifically, to an electrophotographic imaging member and a process for forming the imaging member.

Multilayered photoreceptors have found increasing usage in electrophotographic copying machines and printers. The photoreceptors can be characterized as "layered photoreceptors" having at least a partially transparent photosensitive layer overlying a conductive ground plane. One problem inherent in using these layered photoreceptors becomes manifest when exposing the surface of the photoreceptor to a coherent beam of radiation, typically from a helium-neon or laser diode modulated by an image input signal. Depending upon the physical characteristics, two dominant reflections of the incident coherent light are on the surface of the photoreceptor; e.g., a first reflection from the top surface and a second reflection from the top surface of the relatively opaque conductive ground plane. This condition is shown in FIG. 1; coherent beams 1 and 2 are incident on a layered photoreceptor 6 comprising a charge transport layer 7, charge generator layer 8, and a ground plane 9. The two dominant reflections are: from the top surface of layer 7, and from the top surface of ground plane 9. Depending on the optical path difference as determined by the thickness and index of refraction of layer 7, beams 1 and 2 can interfere constructively or destructively when they combine to form beam 3. When the additional optical path traveled by beam 1 (dashed rays) is an integer multiple of the wavelength of the light, constructive interference occurs, more light is reflected from the top of charge transport layer 7 and, hence, less light is absorbed by charge generator layer 8. Conversely, a path difference producing destructive interference means less light is lost out of the layer and more absorption occurs within the charge generator layer 8. The difference in absorption in the charge generator layer 8, typically due to layer thickness variations within the charge transport layer 7, is equivalent to a spatial variation in exposure on the surface. This spatial exposure variation present in the image formed on the photoreceptor becomes manifest in the output copy derived from the exposed photoreceptor. FIG. 2 shows the areas of spatial exposure variation (at 25×) within a photoreceptor of the type shown in FIG. 1 when illuminated by a He-Ne laser with an output wavelength of 633 nm. The pattern of light and dark interference fringes look like the grains on a sheet of plywood. Hence the term "plywood effect" is generically applied to this problem.

One method of compensating for the plywood effect known to the prior art is to increase the thickness of and, hence, the absorption of the light by the charge generator layer. For most systems, this leads to unacceptable tradeoffs; for example, for a layered organic photoreceptor, an increase in dark decay characteristics and electrical cyclic instability may occur. Another method, disclosed in U.S. Pat. No. 4,618,552 is to use a photoconductive imaging member in which the ground plane, or an opaque conductive layer formed above or below the ground plane, is formed with a rough surface morphology to diffusely reflect the light. A still further method disclosed in co-pending application U.S.S. Ser. No. 07/523,639, assigned to the same assignee as the present invention, is to modify the imaging member by forming the ground plane itself of a low reflecting material.

A second problems associated with the layered photoreceptor is the possibility of separation (delamination) of one or more of the layers at one of the layered interfaces.

According to a first aspect of the present invention, the plywood effect is significantly reduced by suppressing the reflections from the conductive substrate. This is accomplished by coating the ground plane with a low-reflection coating of a material with a selected index of refraction, one preferred material being titanium oxide ($T_iO_2$). According to a second aspect of the invention, it has been found that a $T_iO_2$ layer in a preferred thickness range also greatly improves the adhesion of those layers vulnerable to delamination. More particularly, the invention relates to a photosensitive imaging member comprising at least a transparent photoconductive charge transport layer, overlying a charged generator layer and a conductive ground plane the ground plane being characterized by being coated with a low-reflection material having a refractive index greater than 2.05.

DESCRIPTION OF THE INVENTION

Figure 3:
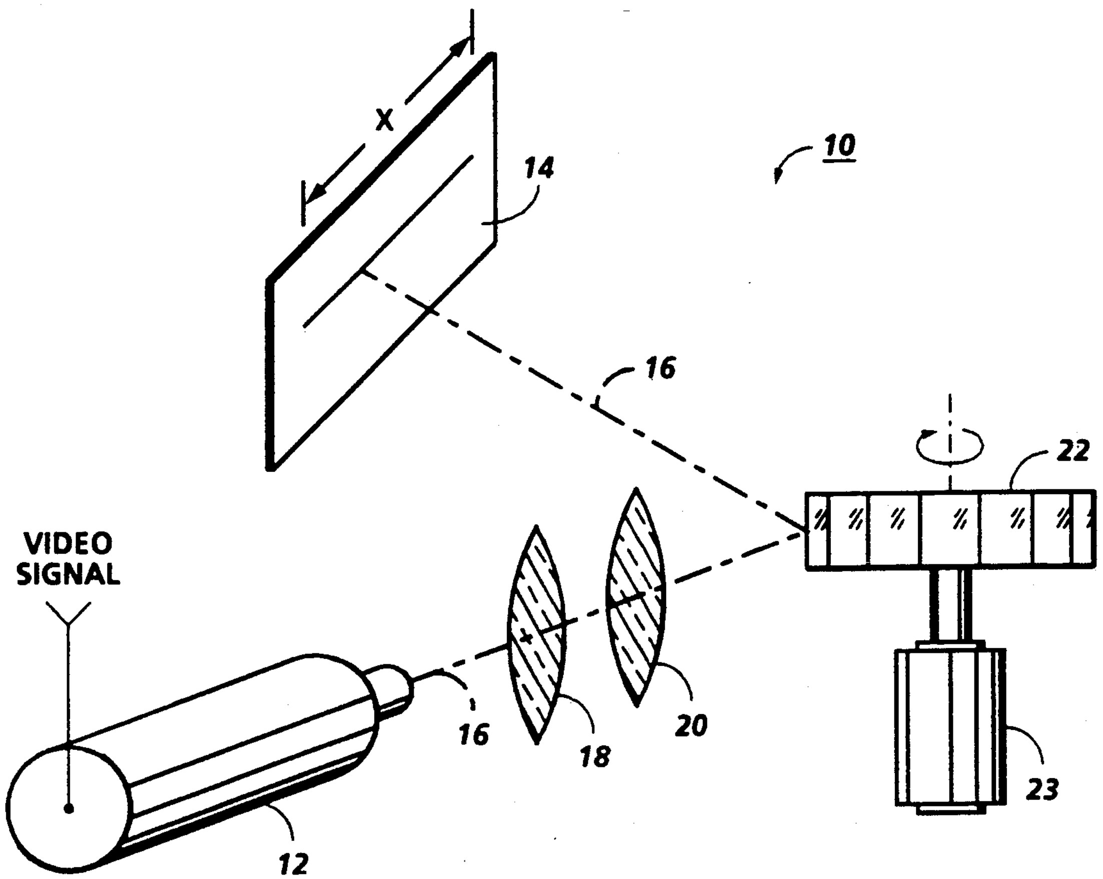
FIG. 3 is a schematic representation of an optical system incorporating a coherent light source to scan a light beam across a photoreceptor modified to reduce the interference effect according to the present invention.

FIG. 3 shows an imaging system 10 wherein a laser 12 produces a coherent output which is scanned across photoreceptor 14. In response to video signal information representing the information to be printed or copied, the laser diode is driven so as to provide a modulated light output beam 16. Flat field collector and objective lens 18 and 20, respectively, are positioned in the optical path between laser 12 and light beam reflecting scanning device 22. In a preferred embodiment, device 22 is a multi-faceted mirror polygon driven by motor 23, as shown, Flat field collector lens 18 collimates the diverging light beam 16 and field objective lens 20 causes the collected beam to be focused onto photoreceptor 14 after reflection from polygon 22. Photoreceptor 14, in a preferred embodiment, is a layered photoreceptor shown in partial cross-section in FIG. 4.

Figure 4:
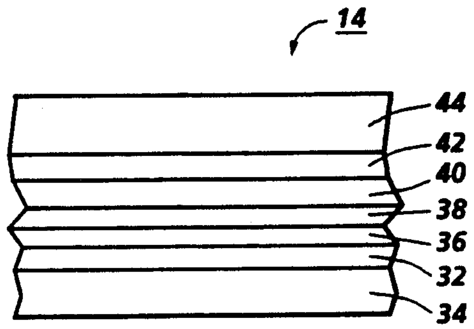
FIG. 4 is a cross-sectional view of the photoreceptor of FIG. 3.

Referring to FIG. 4, photoreceptor 14 is a layered photoreceptor which includes a conductive ground plane 32 formed on a dielectric substrate 34 (typically polyethylene terephthalate (PET)), anti-reflection layer 36, a blocking layer 38, interface layer 40, a charge generating layer 42, and a transparent charge transport layer 44. According to the present invention, anti-reflection coating 36 is formed over the ground plane. A photoreceptor of this type (absent the anti-reflection layer 36) is disclosed in U.S. Pat. No. 4,588,667 whose contents are hereby incorporated by reference.

Photoreceptor 14 is subject to both the plywooding effect problem described above as well as the delamination problem, also described above. As will be seen, the thickness of the anti-reflection coating 36 can be selected so as to address either or both problems.

Figure 1:
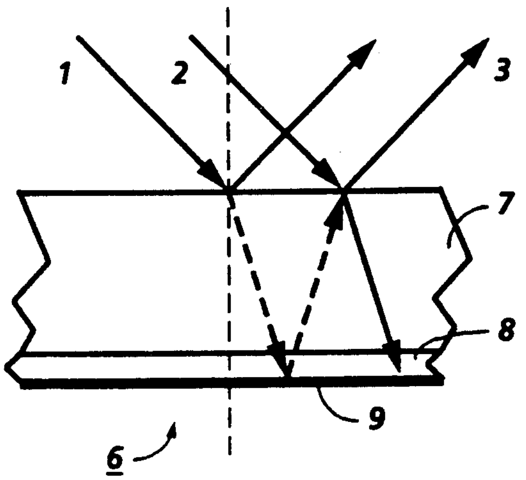
FIG. 1 PRIOR ART
FIG. 1 shows coherent light incident upon a prior art layered photosensitive medium leading to reflections internal to the medium.
Figure 2:
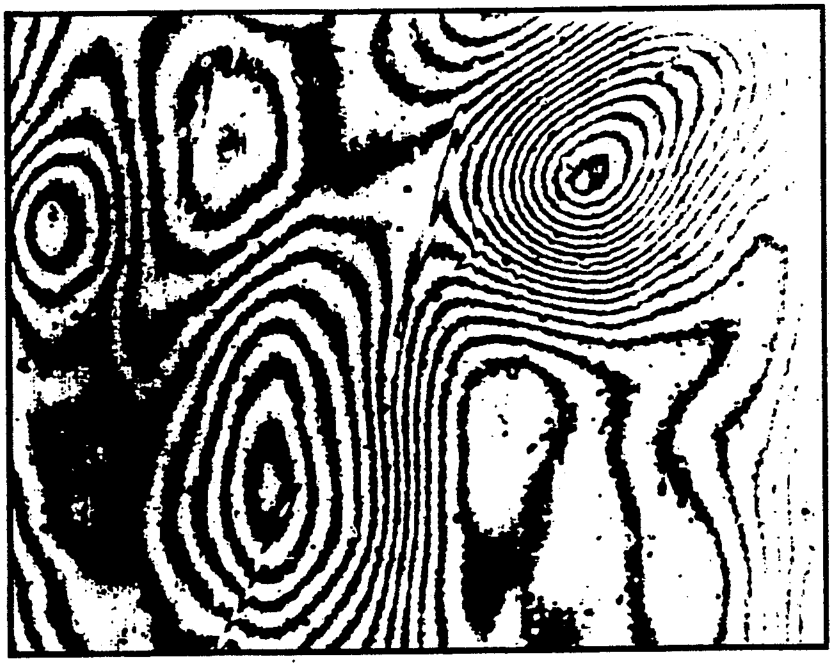
FIG. 2 shows a spatial exposure variation plywood pattern in the exposed photosensitive medium of FIG. 1 produced when the spatial variation in the absorption within the photosensitive member occurs due to an interference effect.
Figure 5:
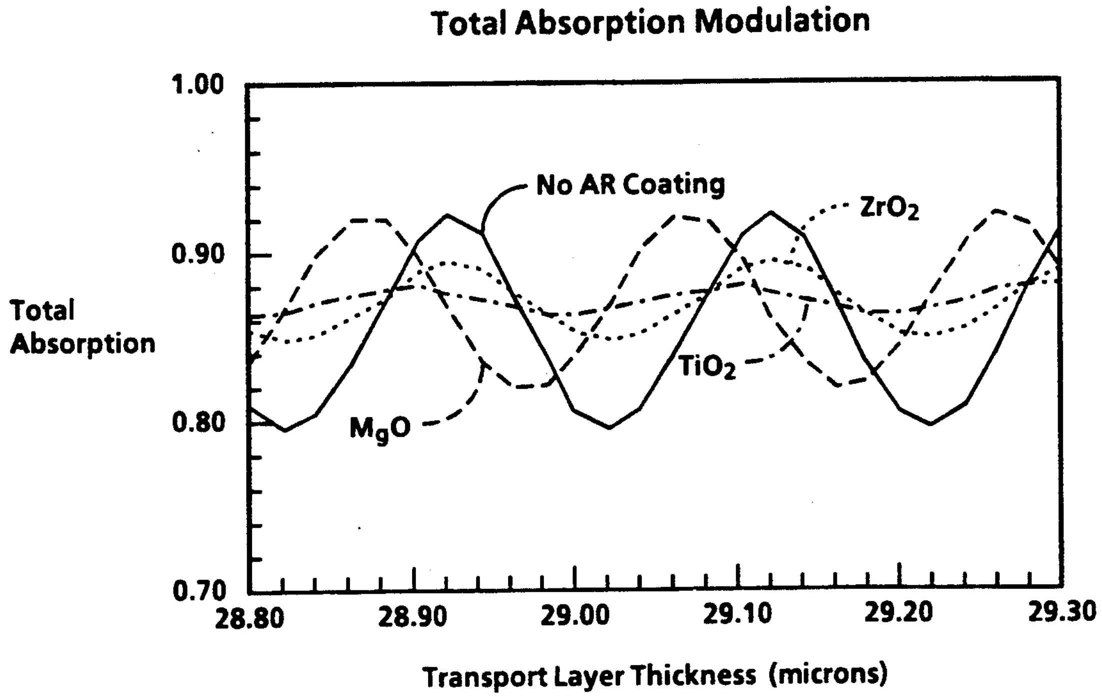
FIG. 5 is a plot of total absorption versus transport layer thickness for photoreceptor incorporating various low-reflection materials.

Turning now to a more detailed consideration of anti-reflection layer 36 shown in FIG. 4, according to a first aspect of this invention, the layer is designed to suppress the reflectivity of the light beams shown in dotted form in FIG. 1 from the surface of ground plane 32. The layer is formed by means of neon RF sputtering, l-beam evaporation or other coating methods which allow deposition of the $T_iO_2$ on the ground plane Layer 36 increases optical transmission through the ground plane thus decreasing its reflectivity. It has been found that the interference fringe contrast decreases as the index of the refraction of layer 36 increases, and that materials with index of refractions of approximately 2.05 or greater are most suitable for use as anti-reflection layers. This is demonstrated by referring to FIG. 5 which shows a plot of three different materials used as anti-reflection layer 36. The plot shows total absorption plotted against transport layer thickness. The coatings shown are of three different materials ($M_gO$, $Z_rO_2$, $T_iO_2$) as well as a sample plot of absorption in the absence of any anti-reflection coating. The thicknesses of each material used as anti-reflection coatings are optimized to produce the lowest reflectivity at the layer 36 surface for a specific wavelength. The modulation in the absorption correlates directly to the interference fringe contrast with larger magnitude modulations signifying strong plywood fringe contrast in the final output print. Conversely, a small magnitude modulation results in weak plywood fringe contrast in the output print. Thus, $T_iO_2$, with an index of 2.5 is a more preferable material than $Z_rO_2$ with an index of 2.05 which in turn is preferable to $M_gO$ with an index of 1.72. For comparison purposes, a plot of modulation with no anti-reflection coating at all is shown to be quite close to the $M_gO$ plot. Other acceptable anti-reflection materials are $C_r2O_3$ with an Index=2.4. Calculations for a photoreceptor of the type shown in FIG. 4 with a charge generator layer thickness of 1.8 microns and in the absence of an anti-reflection layer results in a modulation of approximately 14%. The modulation for a device with a $T_iO_2$ anti-reflection layer about 60 nm thick reduces the modulation to 2.5%. The reduction in plywood fringe contrast itself is greater then 5×.

According to a second aspect of the invention, it has been found that if $T_iO_2$ is the material used for layer 36 and if the layer is formed to a thickness of between 20 nm and 180 nm, the adhesion at the interface of layers 42, 40 is greatly increased. The thickness may differ from the optimum thickness stated above. The improvement was tested by conducting a series of peel tests which measured reverse peel of adhesion values at the interface of interest. As shown in Table 1, layer $T_iO_2$ layers of various thickness were applied to a titanium ground plane in a photoreceptor of the type shown in FIG. 4. Adhesion values were measured and compared to a control photoreceptor which measured the adhesion without layer 36. As shown, the reverse peel strength was improved by a factor of 7 or 8 times over the control. The optimum thickness of the $T_iO_2$ ranges from 20 nm to 180 nm. In separate tests, electrical parameters of the photoreceptor such as dark decay sensitivity or electrical cyclic stability were not affected.

TABLE 1

Adhesion Values of TiO2

| Sample Description | | Reverse Peel | | |
|---|---|---|---|---|
| | | adhesion value | comments | |
| nominal thickness of $TiO_2$ (nm) | ground plane | (g/cm) | delaminated interface (optical observation) | uniformity of peeling |
| 60 | Ti | 44.1 | 42/40 | non-uniform |
| 90 | Ti | 38.6<br>90.6 | 42/40 | non-uniform |
| 120 | Ti | 51.9 | 42/40 | non-uniform |
| 180 | Ti | 45.7 | 42/40 | non-uniform |
| control (mod 5, web) | Ti | 6.7 | 42/40 | uniform |

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A photosensitive imaging member comprising at least a transparent photoconductive charge transport layer overlying a charge generator layer, a conductive ground plane the ground plane being characterized by being coated with a low-reflection material having a refractive index greater than 2.05, a blocking layer overlying said low-reflection material and an interface layer between said blocking layer and said charge generator layer.

2. The imaging member of claim 1 wherein said low-reflection material is $T_iO_2$ having a thickness ranging from 20 nm to 180 nmnm.

3. A process for forming a photosensitive imaging member comprising the steps of:

providing a dielectric substrate, selectively depositing a metal onto the dielectric substrate, thereby forming a ground plane, overlying said ground plane with a low-reflection material having a refractive index greater than 2.05, overlying said low-reflection material with a blocking layer, overlying the blocking layer with at least a charge transport layer and charge generate or layer.

* * * * *